US012457428B2

(12) United States Patent
Lavoie

(10) Patent No.: US 12,457,428 B2
(45) Date of Patent: Oct. 28, 2025

(54) DYNAMIC AIRBAG DEPLOYMENT SYSTEM USING CAMERA THERMAL MANAGEMENT

(71) Applicant: MAGNA ELECTRONICS, LLC, Southfield, MI (US)

(72) Inventor: Erick Lavoie, Van Buren Township, MI (US)

(73) Assignee: MAGNA ELECTRONICS, LLC, Southfield, MI (US)

( * ) Notice: Subject to any disclaimer, the term of this patent is extended or adjusted under 35 U.S.C. 154(b) by 231 days.

(21) Appl. No.: 18/490,889

(22) Filed: Oct. 20, 2023

(65) Prior Publication Data

US 2025/0133302 A1 Apr. 24, 2025

(51) Int. Cl.
| | | |
|---|---|---|
| *H04N 23/951* | (2023.01) | |
| *B60R 21/01* | (2006.01) | |
| *B60R 21/015* | (2006.01) | |
| *B60R 21/16* | (2006.01) | |
| *G06V 20/59* | (2022.01) | |
| *G06V 40/10* | (2022.01) | |
| *H04N 23/52* | (2023.01) | |

(52) U.S. Cl.
CPC ..... *H04N 23/951* (2023.01); *B60R 21/01538* (2014.10); *B60R 21/16* (2013.01); *G06V 20/593* (2022.01); *G06V 40/10* (2022.01); *H04N 23/52* (2023.01); *B60R 2021/01211* (2013.01)

(58) Field of Classification Search
None
See application file for complete search history.

(56) References Cited

U.S. PATENT DOCUMENTS

| | | | |
|---|---|---|---|
| 10,894,546 B2 | 1/2021 | Vanhelle et al. | |
| 2014/0362889 A1* | 12/2014 | Jang | G06F 1/206 374/152 |
| 2017/0108862 A1* | 4/2017 | Mikkelsen | B60K 28/066 |
| 2019/0143989 A1 | 5/2019 | Oba | |
| 2021/0118108 A1 | 4/2021 | Noble | |
| 2021/0365702 A1 | 11/2021 | Edwards | |

FOREIGN PATENT DOCUMENTS

| | | |
|---|---|---|
| WO | WO-2017195405 A1 | 11/2017 |
| WO | WO-2019200434 A1 | 10/2019 |
| WO | WO-2019241834 A1 | 12/2019 |

* cited by examiner

*Primary Examiner* — Clifford Hilaire

(57) ABSTRACT

A camera control system of a vehicle includes: a camera within a passenger cabin of the vehicle and configured to capture images including an occupant of a seat within the passenger cabin; an overheat module configured to, using a thermal model of the camera, determine a period from a present time when a temperature of the camera is expected to become greater than a predetermined temperature and shut down; and a frame rate module configured to set a frame rate of the camera based on the period, where the camera is configured to capture images at the frame rate.

20 Claims, 5 Drawing Sheets

DYNAMIC AIRBAG DEPLOYMENT SYSTEM USING CAMERA THERMAL MANAGEMENT

FIELD

The present disclosure relates to passenger cabin monitoring systems and methods for vehicles and more particularly to systems and methods for controlling temperature of cameras of dynamic airbag deployment systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles can be used for individual use (e.g., by the same one or more people) or for shared use by many different people. Rideshare systems allow users to request transportation from a pick-up location to a drop-off location.

Vehicles may be human-operated or autonomous vehicles (e.g., cars, vans, buses, bicycles, motorcycles, etc.). Examples of autonomous vehicles include semi-autonomous and fully autonomous vehicles. Human operated vehicles are controlled by a human using input devices, such as a steering wheel, an accelerator pedal, and a brake pedal.

SUMMARY

In a feature, a camera control system of a vehicle includes: a camera within a passenger cabin of the vehicle and configured to capture images including an occupant of a seat within the passenger cabin; an overheat module configured to, using a thermal model of the camera, determine a period from a present time when a temperature of the camera is expected to become greater than a predetermined temperature and shut down; and a frame rate module configured to set a frame rate of the camera based on the period, where the camera is configured to capture images at the frame rate.

In further features, the frame rate module is configured to set the frame rate further based on a second period from the present time when a collision of the vehicle is expected to occur.

In further features, the frame rate module is configured to set the frame rate based on the period being greater than the second period.

In further features, the frame rate module is configured to set the frame rate such that the period is greater than the second period by a predetermined period.

In further features, the overheat module is configured to determine the period based on the frame rate of the camera.

In further features, the overheat module is configured to decrease the period as the frame rate increases.

In further features, the overheat module is configured to determine the period based on an ambient temperature.

In further features, the ambient temperature is an ambient air temperature within the passenger cabin.

In further features, the overheat module is configured to decrease the period as the ambient temperature increases.

In further features, the overheat module is configured to determine the period based on a solar load.

In further features, the overheat module is configured to decrease the period as the solar load increases.

In further features, the frame rate module is configured to set the frame rate of the camera based on the period when a severity level of a collision is greater than a predetermined value.

In further features, the frame rate module is configured to decrease the frame rate of the camera when the severity level of the collision decreases.

In further features, the frame rate module is configured to set the frame rate of the camera based on the period when a second period from the present time when a collision of the vehicle is expected to occur is less than a predetermined period.

In further features, the frame rate module is configured to decrease the frame rate of the camera to when the second period increases.

In a feature, a restraint control system includes: the camera control system; a restraint for the seat; and a restraint control module configured to selectively actuate the restraint based on an image from the camera.

In further features, the restraint is an air bag.

In further features, the restraint control module is configured to set a deployment characteristic of the air bag based on the image from the camera.

In further features, the camera is a time of flight camera.

In a feature, a camera control method for a vehicle includes: by a camera within a passenger cabin of the vehicle, capturing images including an occupant of a seat within the passenger cabin; using a thermal model of the camera, determining a period from a present time when a temperature of the camera is expected to become greater than a predetermined temperature and shut down; and setting a frame rate of the camera based on the period, wherein the camera captures images at the frame rate.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Airbag deployment force, direction, and/or timing for a seat may be set based on occupant position and movement, such as relative to the airbag. Occupant position and movement may be determined using images from a camera within the passenger cabin of a vehicle, which may be referred to as an occupant camera.

The occupant camera could capture images at a predetermined fixed frame rate. Operating the camera at a higher frame rate however may improve deployment characteristics of the air bag, such as force, direction, timing, etc. Temperature of the occupant camera however increases as frame rate increases. The occupant camera may overheat and shut down (and stop capturing images) when the temperature becomes greater than a predetermined temperature.

The present application involves selectively adjusting the frame rate of the occupant camera to prevent the camera from overheating prior to a collision. This ensures that images from the occupant camera can be used for airbag deployment. The occupant camera can also be shut down when a collision is not likely to occur. This may prevent the occupant camera from unnecessarily consuming power and may increase a range of the vehicle, such as a maximum range of an electric vehicle.

Figure 1:
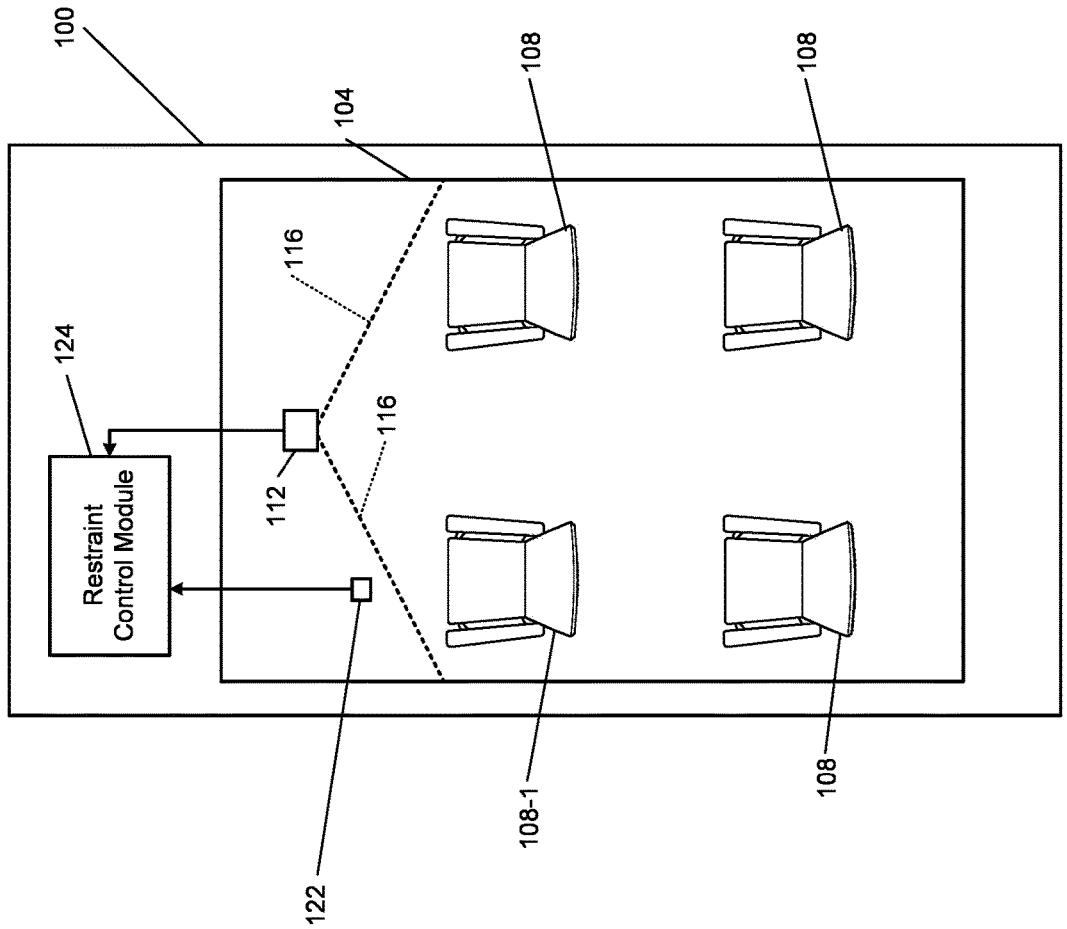
FIGS. 1-3 are functional block diagrams of example systems of a vehicle.

FIG. 1 is a functional block diagram of an example system of a vehicle 100. The vehicle 100 includes a passenger cabin 104. The vehicle 100 also includes one or more propulsion devices, such as one or more electric motors and/or an engine. The vehicle 100 may include a transmission and/or other types of gearing devices configured to transfer torque to one or more wheels of the vehicle 100 from the engine and/or the electric motor(s).

One or more seats 108 are located within the passenger cabin 104. Occupants of the vehicle 100 may sit on the seats 108. While the example of the vehicle 100 including four seats is provided, the present application is also applicable to greater and lesser numbers of seats. The vehicle 100 may be a sedan, a van, a truck, a coupe, a utility vehicle, boat, airplane, or another suitable type of land, air, or water based vehicle. The present application is also applicable to the vehicle 100 being a public transportation vehicle, such as a bus, a train, tram, street car, or another suitable form of transportation.

A driver sits on a driver's seat, such as 108-1. A driver may actuate an accelerator pedal to control acceleration of the vehicle 100. The driver may actuate a brake pedal to control application of brakes of the vehicle 100. The driver may actuate a steering wheel to control steering of the vehicle 100. In various implementations, the vehicle 100 may be an autonomous vehicle or a semi-autonomous vehicle. In autonomous vehicles and semi-autonomous vehicles, acceleration, braking, and steering may be at least at times controlled by one or more control modules of the vehicle 100.

A camera 112 is disposed to capture images including eyes, heads, faces, and upper torsos of users (occupants) of the vehicle 100, such as the driver. The camera 112 has a predetermined field of view (FOV). An example FOV is illustrated by 116 in FIG. 1. The driver's seat (e.g., 108-1) is disposed within the predetermined FOV of the camera 112. One or more of the seats 108 may also be located within the predetermined FOV of the camera 112. In various implementations, the camera 112 may be disposed on the vertical top of a steering wheel. The camera 112 may be a time of flight (ToF) camera or another suitable type of camera. In various implementations, the camera 112 may include a depth component, such as a red green blue depth (RGB-D) camera.

Figure 2:
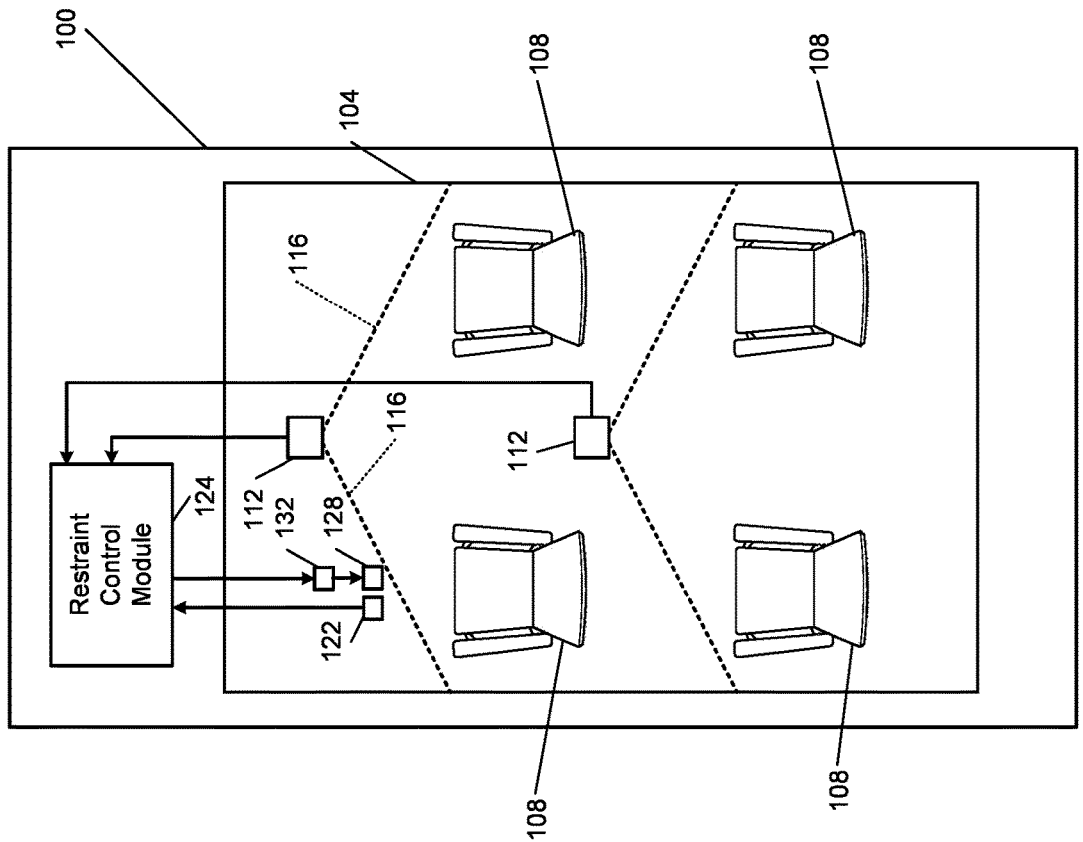
Figure 3:
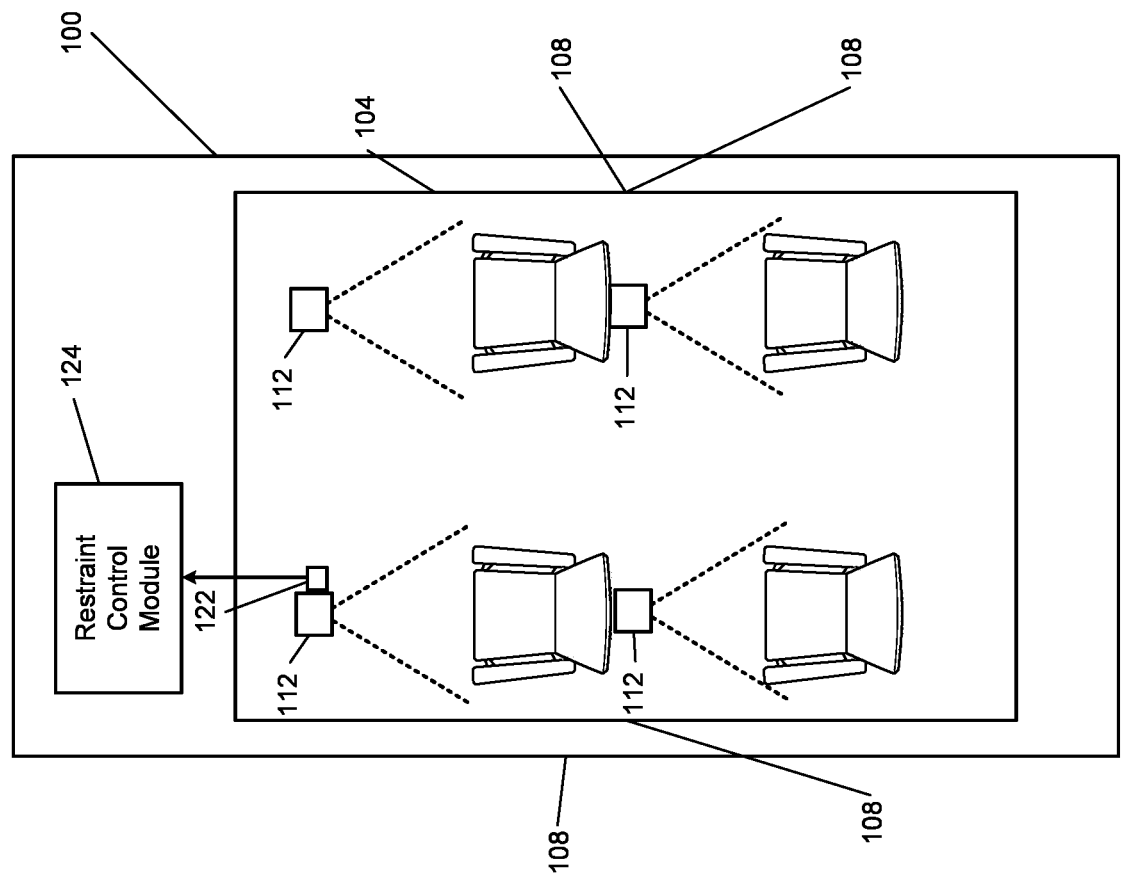

While the example of one camera is provided, one camera may capture images of users in front seats of the vehicle, and one camera may capture images of users in rear seats of the vehicle 100, such as shown in the example of FIG. 2. Alternatively, one camera may be provided per seat to capture images of users in that seat, such as shown in the example of FIG. 3.

In various implementations one or more other cameras may be included, for example, to detect and locate users, heads, faces, eyes, etc. While the example of passengers sitting in seats is provided, the present application is also applicable to passengers that are standing and in other orientations in vehicles.

One or more other types of sensors are also included. For example, a radar sensor 122 may also be included. The radar sensor 122 may output radar signals toward the driver's seat (e.g., 108-1) and receive signals reflected back to the radar sensor 122. One or more parameters of the driver (e.g., height and weight) may be determined based on the received signals. The radar sensor may be, for example, a 77 gigahertz radar sensor or have one or more other suitable frequencies. In various implementations, one radar sensor may be provided per seat (e.g., like the cameras 112 in the example of FIG. 3) or per row (e.g., like the cameras 112 in the example of FIG. 2), or for the entire vehicle (e.g., like the camera 112 in the example of FIG. 1).

A restraint control module 124 controls deployment of restraints of the vehicles, such as when a collision of the vehicle is detected. An example restraint 128 is illustrated in FIG. 2 in association with the driver's seat 108. One or more restraints may be provided for each seat. Examples of restraints include air bags and other types of restraints.

A restraint actuator 132 actuates the restraint 128 in response to input from the restraint control module 124. The restraint 128 and the restraint actuator 132 are not shown in FIGS. 1 and 3 for simplicity of the drawings but would be included. Also, while only the restraint 128 is shown, one or more restraints may be included per seat. Additional restraints for two or more seats may also be implemented.

The restraint control module 124 controls deployment (e.g., force, timing, etc.) of the restraints, such as based on input from the camera 112 and radar signals from a radar sensor 122.

Figure 4:
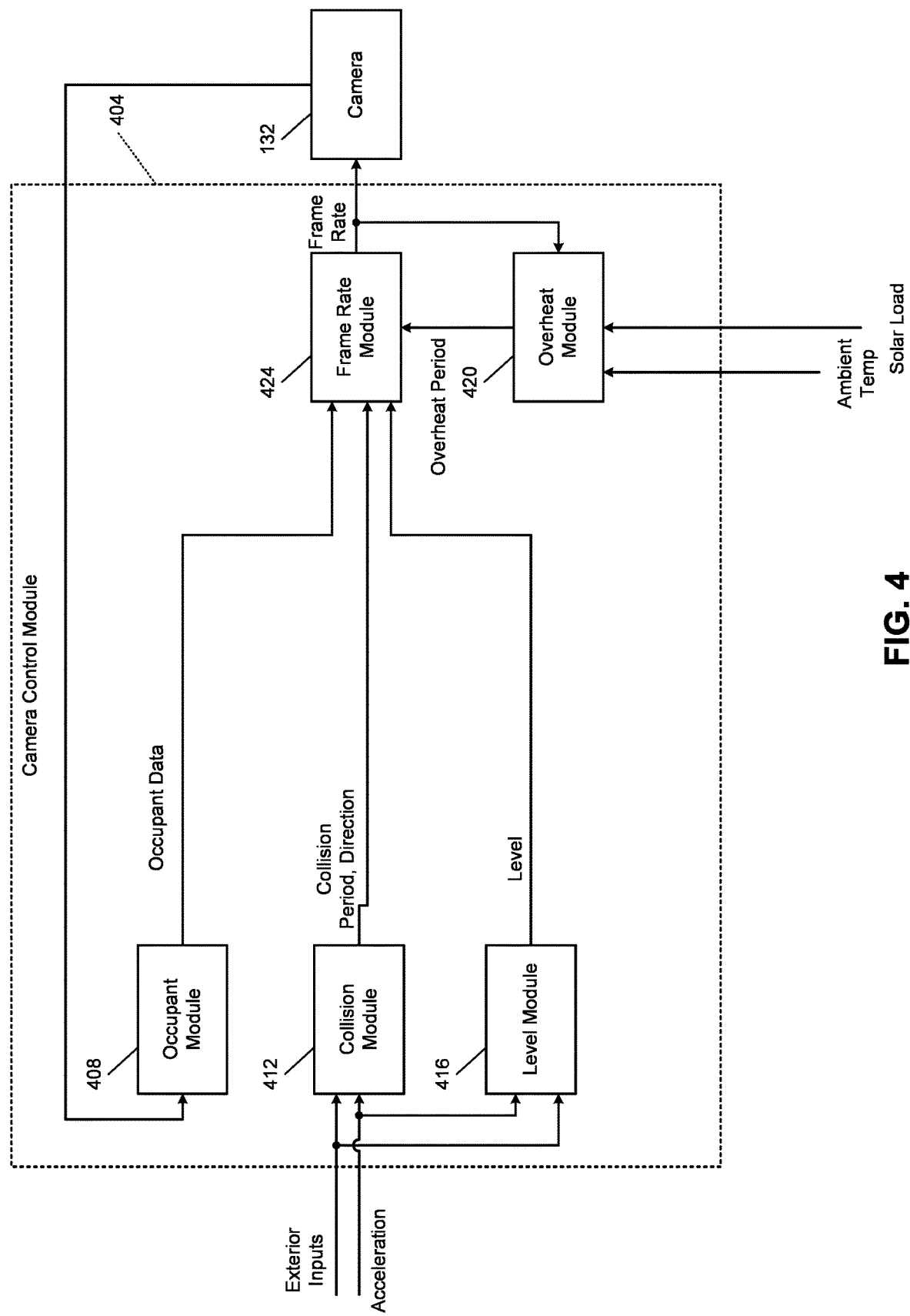
FIG. 4 is a functional block diagram of an example implementation of a camera control module.

FIG. 4 is a functional block diagram of an example implementation of a camera control module 404. The camera control module 404 controls a frame rate of the camera 132. The camera 132 captures images at the frame rate set by the camera control module 404. While the example of the camera 132 is provided, the camera control module 404 may control the frame rate of each occupant camera of the vehicle in the same way.

An occupant module 404 determines a position of an occupant of a seat using an image from the camera 132. The occupant module 404 may update the position of the occupant for each image captured. The position of the occupant may be, for example, expressed relative to an airbag of the seat. The occupant module 404 may determine a movement (e.g., direction and amount) based on a change in the position between two images taken at two times.

A collision module 412 determines a collision period and a collision direction of the vehicle. The collision period may correspond to a period (from the present time) until the vehicle is expected to collide with an object. The collision direction may correspond to a direction of the collision between the vehicle and the object. The collision module 412 may determine the collision period and the collision direction based on exterior inputs from one or more exterior cameras and/or sensors, acceleration of the vehicle measured using an acceleration sensor, and/or one or more other parameters. Examples of exterior sensors include light detection and ranging (LIDAR) sensors, radar sensors, ultrasound sensors, and other types of exterior sensors that sense objects outside of the vehicle. Exterior cameras capture images in front of, beside of, and/or behind the vehicle. The collision module 412 may, for example, decrease the collision period as a distance between an object and the vehicle decreases and vice versa. The collision direction may determine the collision direction based on the location and/or movement of the object relative to the vehicle. The collision module 412 may, for example, decrease the collision period as acceleration of the vehicle increases and vice versa.

A level module 416 determines a severity level of the collision between the vehicle and the object based on one or more of the exterior inputs from the one or more exterior cameras and/or sensors, the acceleration of the vehicle measured using an acceleration sensor, and/or one or more other inputs. The severity level may be, for example, an integer within a predetermined range, such as 0-5 or another suitable range. The expected severity of the collision may increase as the severity level increases and vice versa. For example, a severity level of 5 may be expected to be more severe than a severity level of 1. The level module 416 may, for example, increase the severity level as the acceleration increases and vice versa. The level module 416 may increase the severity level as the amount of expected contact area between the vehicle and the object increases and vice versa. The level module 416 may adjust the severity level based on the direction of travel of the object. For example, the level module 416 may increase the severity level when the object and the vehicle are heading in opposite directions and toward each other. The level module 416 may set the severity level based on one or more other characteristics.

An overheat module 420 determines an overheat period of the camera 132 using a thermal model of the camera 132. The overheat period may correspond to a period (from the present time) until the camera 132 is expected to overheat. The camera 132 overheats when a temperature of the camera 132 becomes greater than a predetermined overheat temperature. The camera 132 may monitor the temperature and shut itself down and not capture images when the temperature is greater than the predetermined overheat temperature, such as to prevent the camera 132 from being damaged by heat. The camera 132 may maintain itself off until the temperature becomes less than a predetermined temperature that is less than the predetermined overheat temperature.

The overheat module 420 may determine the overheat period of the camera 132 based on an ambient temperature within the passenger cabin, a present solar load, and the present frame rate of the camera 132. The overheat module 420 may determine the overheat period, for example, using one or more equations and/or lookup tables that relate ambient temperatures, solar loads, and frame rates to overheat periods. For example, the overheat module 420 may decrease the overheat period as the ambient temperature increases and vice versa. The ambient temperature may be, for example, measured using a temperature sensor within the passenger cabin. The overheat module 420 may decrease the overheat period as solar load increases and vice versa. The solar load may be, for example, measured using a light sensor or estimated, such as based on a present time of day at the location of the vehicle, or obtained from a remote data source based on the location of the vehicle. The overheat module 420 may decrease the overheat period as the present frame rate of the camera 132 increases and vice versa. Temperature of the camera 132 increases as the frame rate used to capture images increases.

A frame rate module 424 sets the frame rate of the camera 132. The camera 132 captures images at the frame rate set by the frame rate module 424. When at least one of (a) the severity level is less than a predetermined value and (b) the collision period is greater than a predetermined period, the frame rate module 424 may set the frame rate of the camera 132 to zero and operate the camera 132 in a standby mode as a collision of the vehicle is not likely. This may minimize power consumption of the camera 132 and increase a range of the vehicle. The predetermined period may be, for example, 1 second or another suitable period. The predetermined value may be, for example, 2 in the example of severity levels ranging from 0 to 5 or another suitable value.

When one or both of (a) the severity level is greater than or equal to the predetermined value and (b) the collision period is less than or equal to the predetermined period, the frame rate module 424 may set the frame rate to greater than zero based on at least one of the occupant position, the occupant movement, the collision direction, the collision period, and the overheat period. For example, the frame rate module 424 may increase the frame rate based on adjusting the overheat period to be greater than the collision period by at least a predetermined period. The predetermined period may be, for example, 1 second or another suitable period. In this manner, the camera 132 may not overheat until after the collision may occur.

The frame rate module 424 may set the frame rate, for example, using one or more equations and/or lookup tables that relate occupant positions, occupant movements, collision directions, overheat periods, and collision periods to frame rates. The frame rate module 424 may increase the frame rate when the occupant position is moving toward the airbag. The frame rate module 424 may increase the frame rate when the collision direction would cause the occupant to move toward the airbag. The frame rate module 424 may increase the frame rate as the collision period decreases and vice versa.

Figure 5:
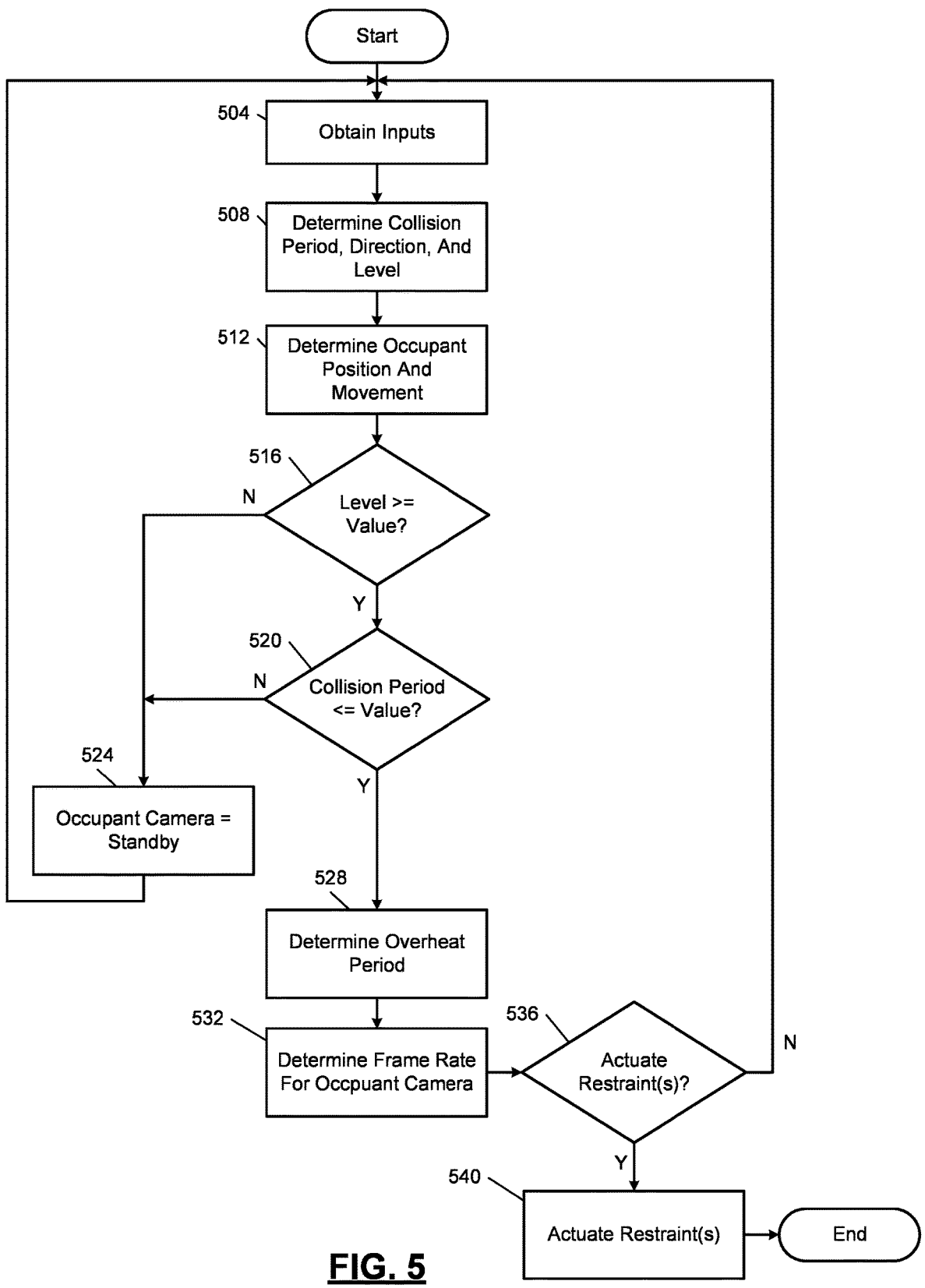
FIG. 5 includes an example method of controlling the frame rate of the camera and controlling airbag deployment.

FIG. 5 is a flowchart depicting an example method of controlling the frame rate of the camera 132 and controlling airbag deployment. Control begins with 504 where the camera control module 404 receives the inputs, such as the exterior inputs, acceleration, ambient temperature, solar load, an image from the camera 132, and other inputs. At 508, the collision module 412 determines the collision period and the collision direction as described above. The level module 416 also determines the severity level of the collision.

At 512, the occupant module 408 determines the occupant position as described above. The occupant module 408 determines occupant movement, such as a change in the occupant position relative to a previously determined occupant position, such as from the last instance of 512.

At 516, the frame rate module 424 may determine whether the severity level is greater than or equal to the predetermined value. If 516 is false, the frame rate module 424 may set the frame rate of the camera 132 to zero and operate the camera 132 in a standby mode at 528, and control may return to 504. If 516 is true, the frame rate module 424 may continue with 520. In various implementations, if 516 is true, control may continue with 528.

At 520, the frame rate module 424 may determine whether the collision period is less than or equal to the predetermined period (e.g., 1 second). If 520 is true, control may continue with 528. If 520 is false, the frame rate module 424 may set the frame rate of the camera 132 to zero and operate the camera 132 in a standby mode at 528, and control may return to 504.

At 528, the overheat module 420 may determine the overheat period corresponding to the period from the present time when the camera 132 may overheat. At 532, the frame rate module 424 determines the frame rate for the camera 132 as described above. For example, the frame rate module 424 may set the frame rate to adjust the overheat period to be greater than the collision period by the predetermined period.

At 536, the restraint control module 124 determines whether to actuate one or more restraints (e.g., deploy an airbag), such as based on one or more images from the camera 132. If 536 is true, the restraint control module 124 determines how and when to actuate the restraint(s), such as based on one or more images from the camera 132, and actuates the restraint(s) at 540. If 536 is false, control may return to 504.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A camera control system of a vehicle, comprising:
a camera within a passenger cabin of the vehicle and configured to capture images including an occupant of a seat within the passenger cabin;
an overheat module configured to, using a thermal model of the camera, determine a period from a present time when a temperature of the camera is expected to become greater than a predetermined temperature and shut down; and
a frame rate module configured to set a frame rate of the camera based on the period,
wherein the camera is configured to capture images at the frame rate.

2. The camera control system of claim 1 wherein the frame rate module is configured to set the frame rate further based on a second period from the present time when a collision of the vehicle is expected to occur.

3. The camera control system of claim 2 wherein the frame rate module is configured to set the frame rate based on the period being greater than the second period.

4. The camera control system of claim 3 wherein the frame rate module is configured to set the frame rate such that the period is greater than the second period by a predetermined period.

5. The camera control system of claim 1 wherein the overheat module is configured to determine the period based on the frame rate of the camera.

6. The camera control system of claim 5 wherein the overheat module is configured to decrease the period as the frame rate increases.

7. The camera control system of claim 1 wherein the overheat module is configured to determine the period based on an ambient temperature.

8. The camera control system of claim 7 wherein the ambient temperature is an ambient air temperature within the passenger cabin.

9. The camera control system of claim 7 wherein the overheat module is configured to decrease the period as the ambient temperature increases.

10. The camera control system of claim 1 wherein the overheat module is configured to determine the period based on a solar load.

11. The camera control system of claim 10 wherein the overheat module is configured to decrease the period as the solar load increases.

12. The camera control system of claim 1 wherein the frame rate module is configured to set the frame rate of the camera based on the period when a severity level of a collision is greater than a predetermined value.

13. The camera control system of claim 12 wherein the frame rate module is configured to decrease the frame rate of the camera when the severity level of the collision decreases.

14. The camera control system of claim 1 wherein the frame rate module is configured to set the frame rate of the camera based on the period when a second period from the present time when a collision of the vehicle is expected to occur is less than a predetermined period.

15. The camera control system of claim 14 wherein the frame rate module is configured to decrease the frame rate of the camera to when the second period increases.

16. A restraint control system comprising:
the camera control system of claim 1;
a restraint for the seat; and
a restraint control module configured to selectively actuate the restraint based on an image from the camera.

17. The restraint control system of claim 16 wherein the restraint is an air bag.

18. The restraint control system of claim 17 wherein the restraint control module is configured to set a deployment characteristic of the air bag based on the image from the camera.

19. The camera control system of claim 1 wherein the camera is a time of flight camera.

20. A camera control method for a vehicle, comprising:
by a camera within a passenger cabin of the vehicle, capturing images including an occupant of a seat within the passenger cabin;
using a thermal model of the camera, determining a period from a present time when a temperature of the camera is expected to become greater than a predetermined temperature and shut down; and
setting a frame rate of the camera based on the period, wherein the camera captures images at the frame rate.

* * * * *